United States Patent Office 3,142,615
Patented July 28, 1964

3,142,615
METHOD OF CONTROLLING ALGAE WITH ALKYLGUANIDINE SALTS
Donald Clifford Wehner, Stamford, Conn., assignor to American Cyanamid Company, New York, N.Y., a corporation of Maine
No Drawing. Filed Nov. 24, 1961, Ser. No. 154,861
4 Claims. (Cl. 167—22)

This invention relates in general to the control of microorganisms which unchecked tend to interfere with the functioning of water baths, indirect heat exchange systems, cooling towers, tubes, swimming pools and other like aqueous systems found in various industrial and recreational installations. More particularly, it concerns methods and compositions for inhibiting growth of various species of algae in these systems and to render the systems free flowing and efficient in operation.

The novel antialgal agent of the present invention and the method of pest control, which involves its use, are characterized in that the principal active ingredient is an acid salt of dodecylguanidine of the structure:

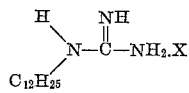

wherein X represents an acid residue of a monocarboxylic acid such as acetic propionic, capric, stearic, benzoic, and naphthoic; dicarboxylic acid such as malonic or succinic and a mineral acid such as hydrochloric or nitric acids.

It has been found that when the aforesaid compound is introduced into an aqueous medium to be treated in quantities of at least 0.5 p.p.m. a rapid diminution in algal growth is noted, and a corresponding marked improvement in the efficiency of the aqueous system is obtained. It has particularly been found that a wide range of species of algae are responsive to treatment with the instantly disclosed antialgal agent leading to a uniform clarity of the system treated.

The compounds of the present invention are well known fungistatic agents effective against fungi found on various agricultural products. However, its use as an algicide has, until applicant's discovery, never before been appreciated. In view of the fact that other compounds also known to be plant fungicides demonstrate no activity when sought to be employed in the combat of algae in aqueous systems, the finding of the present utility for the guanidine salts of the instant invention is truly unexpected. Nevertheless, applicant has discovered that this particular class of guanidine salts in very low dosage are equally as effective in the removal of algae in a totally different environment as they are in the prevention of smut and rust on wheat, for example, in agricultural applications.

It is the primary object of this invention, therefore, to disclose as a novel antialgal agent an acid salt of guanidine.

It is a further object of the present invention to disclose a novel method for control of algae in aqueous systems, which involves the application of such guanidine salts, to the system to be treated.

In general our invention is based on the finding that industrial systems subject to contamination of their conduits, piping, and reservoirs by large masses of algal growths may be rendered free thereof by treatment with a minor but effective amount of a composition comprising chiefly an acid salt of guanidine either alone or in combination with compatible diluents, carriers, solvents and the like either prior to or after contamination with the offending algal growth. This treatment may comprise any one of a number of well recognized methods of application such as spraying, painting, or direct addition into the fluid to be transported through or contained in the system.

One of the best known species of algae which is inhibited by means of treatment in the manner of our invention is Chlamydamonas, which is extremely prolific in fresh water, conduits, and indirect heat exchange units. However, it has been found that the growth of this unicellular green algae may be drastically reduced by the inclusion into the system of quantities of less than 1 p.p.m. of the compounds of the invention rendering the flow characteristics and heat transfer capacity of the heat exchange normal after having been heavily infested prior to treatment.

In addition, quantities of the order of 25 p.p.m. or less of the compound when added to aqueous brine used in oil field flooding will effectively inhibit algal growth therein which unchecked would cause plugging of pipe lines.

From the foregoing, it will be appreciated that for biocidal purposes very low concentrations of the active ingredient are effective for control of algae. For optimum results amounts ranging from 0.5 p.p.m. to about 10,000 p.p.m. of the active ingredient may be applied by any one of a number of convenient means. Such as, for example, by the use of nonaqueous solutions in concert with a suitable emulsifier. In situations where it is to be added into the cooling system it may be in the form of a liquid or a powder.

Compositions containing the guanidine salt may be formulated by admixing the active ingredient with a suitable liquid or solid carrier. In the case of solid carriers, those which are water soluble such as carboxy methyl cellulose, and the like are preferred. Dispersion and emulsion of the active ingredient in a liquid carrier may be conducted by agitation in the presence of an emulsifying or dispersing agent in order to assist in the formation of an emulsion or dispersion. In such preparation a number of well known emulsifying or dispersing agents may be employed such as sodium lauryl sulfate, aliphatic and aromatic sulfonates and the like. Nonionic types of emulsifying agents such as the higher molecular weight alkyl polyglycol ethers and analogous thio ethers such as decyl, dodecyl and tetradecyl polyglycol ethers and thio ethers containing from about 25 to 75 carbon atoms may be used. For convenience the emulsifying agent is mixed with the active ingredient prior to admixture with the carrier, and dispersion is accomplished by agitation of the mixture. The concentration of surfactant in the final emulsion should be sufficient to make the oil and water phases readily dispersible. In general one will employ from about 1 to 20 percent surfactant by weight of active ingredient although such proportion may vary over a fairly wide range of proportions contingent upon the particular emulsifier and the circumstances of the situation.

The following example will serve to illustrate the preparation and use of the new antialgal agent. It is intended that this example is merely to further illustrate the invention and is not intended in any way to limit the scope of the invention which may only be determined by reference to the claims appended herewith.

*Example*

Mix dilutions of dodecylguanidine acetate with nutrient salt solutions containing 3 g. of $NH_4NO_3$, 1 g. of $K_2HPO_4$, 0.25 g. KCl and inoculate the mixture with an actively growing culture of unicellular green algae (chlorophyceal).

Incubate the mixture in sunny areas of a greenhouse for from 2 to 3 weeks and then examine. Grow control flasks containing no dodecylguanidine acetate and observe. The flasks containing the dodecylguanidine acetate in concentration of 0.5 or more show no growth of algae while the control flasks do show a typical green algae growth.

While the aforesaid example is illustrative of one of the many uses of our novel antialgal agent, it is, of course, obvious that a number of other specific applications will at once become obvious to those skilled in the art. It is the intention of applicant to embrace within the scope of his invention the treatment of any industrial or recreational system wherein water contaminated by algae presents a problem in operating the system.

I claim:

1. A method of inhibiting the growth of algae in aqueous media which comprises contacting said algae with a minor but effective amount of an antialgal agent comprising an alkylguanidine salt having the structural formula:

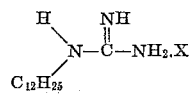

wherein X represents an acid residue of an acid selected from the group consisting of mineral acids, monocarboxylic acids, and dicarboxylic acids.

2. A method according to claim 1 wherein the alkylguanidine salt is dodecylguanidine acetate.

3. A method according to claim 1 wherein the antialgal agent employed comprises a minor but effective amount of an alkylguanidine salt having the structural formula:

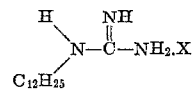

wherein X represents an acid residue of an acid selected from the group consisting of mineral acids, monocarboxylic acids, and dicarboxylic acids and a major amount of an inert carrier.

4. A method according to claim 3 wherein the inert carrier employed is a lower aliphatic alcohol.

References Cited in the file of this patent

UNITED STATES PATENTS 2,906,595  Pelcak et al. _____ Sept. 29, 1959